(12) United States Patent
Ikeda et al.

(10) Patent No.: US 11,236,776 B2
(45) Date of Patent: Feb. 1, 2022

(54) RETAINER

(71) Applicant: YAMASHINA CORPORATION, Kyoto (JP)

(72) Inventors: Seiji Ikeda, Higashiomi (JP); Takatoshi Omori, Kyoto (JP)

(73) Assignee: YAMASHINA CORPORATION, Kyoto (JP)

(*) Notice: Subject to any disclaimer, the term of this patent is extended or adjusted under 35 U.S.C. 154(b) by 237 days.

(21) Appl. No.: 16/471,953

(22) PCT Filed: Dec. 21, 2017

(86) PCT No.: PCT/JP2017/045991
§ 371 (c)(1),
(2) Date: Jun. 20, 2019

(87) PCT Pub. No.: WO2018/117233
PCT Pub. Date: Jun. 28, 2018

(65) Prior Publication Data
US 2020/0088230 A1    Mar. 19, 2020

(30) Foreign Application Priority Data
Dec. 22, 2016 (JP) .............................. JP2016-249710

(51) Int. Cl.
*F16B 37/04* (2006.01)
*F16B 39/24* (2006.01)

(52) U.S. Cl.
CPC .............. *F16B 37/04* (2013.01); *F16B 39/24* (2013.01)

(58) Field of Classification Search
CPC .... F16B 5/0208; F16B 5/0258; F16B 13/124; F16B 37/00; F16B 37/04; F16B 39/24;
(Continued)

(56) References Cited

U.S. PATENT DOCUMENTS 2,588,372 A * 3/1952 Erb .................. F16B 39/26
411/432
2,949,142 A * 8/1960 Sumerak ............... F16B 37/122
411/180

(Continued)

FOREIGN PATENT DOCUMENTS

JP       55-105616 U    7/1980
JP       58-16416 U     2/1983
(Continued)

OTHER PUBLICATIONS

Nut disclosed on the internet at //www.yamashina.ne.jp/product/al-armor-nut.html on Aug. 4, 2017.

*Primary Examiner* — Roberta S Delisle
(74) *Attorney, Agent, or Firm* — Capitol City TechLaw

(57) ABSTRACT

To provide a retainer having excellent moldability and durability while having a predetermined pull-out load and predetermined rotational torque. The retainer includes a nut main body 10 having a female thread 11, longitudinal ribs 13 formed between a plurality of recessed portions 12 and 12 provided along an outer circumferential surface of the nut main body 10, transverse ribs 14 formed between a plurality of recessed portions 12 and 12 provided on the outer circumferential surface of the nut main body 10 along an axial center direction, and the longitudinal ribs 13 and the transverse ribs 14 are connected to each other. Then, the longitudinal ribs 13 and the transverse ribs 14 form a frame structure.

12 Claims, 16 Drawing Sheets

(58) Field of Classification Search
CPC ... F16B 43/00; Y10S 411/999; B60R 16/0215
USPC ... 411/29, 30, 352–353, 427, 516–517, 546; 16/2.1, 2.4
See application file for complete search history.

(56) References Cited

U.S. PATENT DOCUMENTS

| | | | | | |
|---|---|---|---|---|---|
| D262,863 | S | * | 2/1982 | Barnsdale | 411/180 |
| D287,819 | S | * | 1/1987 | Bullen | D8/385 |
| D287,820 | S | * | 1/1987 | Bullen | D8/385 |
| 5,860,779 | A | * | 1/1999 | Toosky | F16B 37/122 411/432 |
| 6,474,918 | B1 | * | 11/2002 | Kelch | F16B 35/047 411/180 |
| 7,878,746 | B2 | | 2/2011 | Babej | |
| 2002/0021948 | A1 | * | 2/2002 | Stumpf | F16B 37/122 411/180 |
| 2013/0031765 | A1 | * | 2/2013 | Lan | F16B 33/004 29/428 |
| 2013/0034404 | A1 | * | 2/2013 | Pecho | F16B 37/068 411/378 |
| 2014/0186139 | A1 | * | 7/2014 | Park | F16B 37/04 411/427 |

FOREIGN PATENT DOCUMENTS

| | | |
|---|---|---|
| JP | 8-57825 A | 3/1996 |
| JP | 2005-172166 A | 6/2005 |
| JP | 3740246 B2 | 2/2006 |
| JP | 5173671 B2 | 4/2013 |
| JP | 1507013 S | 9/2014 |
| WO | 2008050515 A1 | 5/2008 |

* cited by examiner

Fig.27

| RESIN | SAMPLE | | PULL-OUT LOAD | |
|---|---|---|---|---|
| | | | (kN) | BROKEN LOCATION |
| CFRTP PP | COMPARATIVE EXAMPLE 1 (COMMERCIAL PRODUCT) | No.1 | 7.0 | FALLING-OFF OF NUT |
| | | No.2 | 6.5 | FALLING-OFF OF NUT |
| | EXAMPLE 1 (FIRST EMBODIMENT) | No.1 | 8.9 | BREAKAGE OF BASE |
| | | No.2 | 9.2 | BREAKAGE OF BASE |
| | | No.3 | 8.6 | BREAKAGE OF BASE |
| | EXAMPLE 3 (SECOND EMBODIMENT) | No.1 | 9.2 | BREAKAGE OF BASE |
| | | No.2 | 9.2 | BREAKAGE OF BASE |
| CFRTP PA | COMPARATIVE EXAMPLE 2 (COMMERCIAL PRODUCT) | No.1 | 13.9 | FALLING-OFF OF NUT |
| | | No.2 | 13.7 | FALLING-OFF OF NUT |
| | EXAMPLE 2 (FIRST EMBODIMENT) | | MEASUREMENT WAS NOT CARRIED OUT SINCE IT WAS APPARENT THAT PULL-OUT LOAD OF EXAMPLE 2 WAS GREATER THAN THAT OF COMPARATIVE EXAMPLE 2 FROM MEASUREMENT RESULTS OF EXAMPLES 1 AND 3. | |
| | EXAMPLE 4 (SECOND EMBODIMENT) | No.1 | 17.5 | BREAKAGE OF BASE |
| | | No.2 | 19.3 | BREAKAGE OF BASE |
| | | No.3 | 19.8 | BREAKAGE OF BASE |

Fig.28

| RESIN | SAMPLE | | IDLING TORQUE | |
|---|---|---|---|---|
| | | | (N·m) | BROKEN LOCATION |
| CFRTP PP | COMPARATIVE EXAMPLE 1 (COMMERCIAL PRODUCT) | No.1 | 23.0 | BREAKAGE OF BASE |
| | | No.2 | 22.0 | BREAKAGE OF BASE |
| | | No.3 | 24.0 | BREAKAGE OF BASE |
| | EXAMPLE 1 (FIRST EMBODIMENT) | No.1 | 20.0 | BREAKAGE OF BASE |
| | | No.2 | 20.0 | BREAKAGE OF BASE |
| | | No.3 | 21.0 | BREAKAGE OF BASE |
| | EXAMPLE 3 (SECOND EMBODIMENT) | No.1 | 24.0 | BREAKAGE OF BASE |
| | | No.2 | 25.0 | BREAKAGE OF BASE |
| | | No.3 | 22.0 | BREAKAGE OF BASE |
| CFRTP PA | COMPARATIVE EXAMPLE 2 (COMMERCIAL PRODUCT) | No.1 | 27.0 | BREAKAGE OF BOLT |
| | | No.2 | 29.0 | BREAKAGE OF BOLT |
| | | No.3 | 26.0 | BREAKAGE OF BOLT |
| | EXAMPLE 2 (FIRST EMBODIMENT) | No.1 | 28.0 | BREAKAGE OF BOLT |
| | | No.2 | 28.5 | BREAKAGE OF BOLT |
| | | No.3 | 29.0 | BREAKAGE OF BOLT |
| | EXAMPLE 4 (SECOND EMBODIMENT) | No.1 | 26.0 | BREAKAGE OF BOLT |
| | | No.2 | 26.5 | BREAKAGE OF BOLT |
| | | NO.3 | 31.5 | BREAKAGE OF BOLT |

RETAINER

This application claims priority under 35 USC 119(a)-(d) to JP patent application No. 2016-249710, which was filed on Dec. 22, 2016, the entire content of which is incorporated herein by reference.

TECHNICAL FIELD

The present invention relates to a retainer, for example, to an embedded type nut or collar integrated with a base.

BACKGROUND ART

In the related art, as an embedded type nut, for example, there is an insert nut which is insert-molded in a resin base (refer to Patent Literature 1). The insert nut has a shaft portion and a washer integrally molded with an upper end portion of the shaft portion. Two independent annular band portions are formed on an outer circumferential surface of the shaft portion in order to secure a predetermined pull-out load and predetermined rotational torque. Multiple fine spiral grooves are formed on a surface of each of the annular band portions in order to enhance a bonding force with resin. The spiral grooves provided on the upper annular band portion and the spiral grooves provided on the lower annular band portion are formed in different directions.

CITATION LIST

Patent Literature

Patent Literature 1: Design Registration No. 1507013

SUMMARY OF INVENTION

Technical Problem

However, in the insert nut, multiple fine spiral grooves are formed on the surface of the annular band portion. Accordingly, when the insert nut is insert-molded in the resin base, it is difficult for resin to flow in the spiral grooves, and thus moldability is poor. In particular, when insert-molding is carried out using carbon fiber reinforced resins, the moldability becomes poorer.

Further, in the insert nut, multiple tips formed by the spiral grooves have a sharp shape. Accordingly, a crack or a breakage easily occurs in the resin base, and thus there is a problem of poor durability.

In view of the above problems, an object of the present invention is to provide a retainer having excellent moldability and durability while having a predetermined pull-out load and predetermined rotational torque when being integrated with a base.

Solution to Problem

In order to solve the above problems, a retainer according to the present invention includes a retainer main body having a fitting hole, longitudinal ribs formed between a plurality of recessed portions provided along an outer circumferential surface of the retainer main body, and transverse ribs formed between a plurality of recessed portions provided on the outer circumferential surface of the retainer main body along an axial center direction, and the longitudinal ribs and the transverse ribs are connected to each other.

Advantageous Effects of Invention

According to the present invention, a retainer in which rotational torque is secured with longitudinal ribs, a pull-out load is secured with transverse ribs, and a fastening force is large is obtained. Since the longitudinal ribs and the transverse ribs are connected to each other, a retainer having higher mechanical strength is obtained. In addition, unlike the related art, fine spiral grooves are not provided, there is no possibility of hindering the flow of resin. Therefore, a retainer having excellent moldability even when the retainer of the present application is insert-molded in a base using resin is obtained. In particular, when insert-molding is carried out using carbon fiber reinforced resin, a retainer having excellent moldability more than the related art is obtained.

As an embodiment of the present invention, the fitting hole may have a bottom surface, and the fitting hole may be a through-hole. In addition, a female thread may be provided on an inner circumferential surface of the fitting hole.

Therefore, the retainer can be used as not only a nut but also a collar, and a retainer having excellent versatility is obtained.

As another embodiment of the present invention, the longitudinal ribs may be disposed in a zigzag shape along an axial center.

According to the present embodiment, since the recessed portions are also disposed in a zigzag shape, the flow of resin becomes favorable, and thus moldability is improved.

As another embodiment of the present invention, the longitudinal ribs may be disposed on the same straight line along an axial center.

According to the present embodiment, since the longitudinal ribs disposed on the same straight line receive the rotational torque, a nut capable of withstanding larger rotational torque is obtained.

As another embodiment of the present invention, the longitudinal ribs may have a trapezoidal section.

According to the present embodiment, insert-molding can be carried out without hindering the flow of resin while mechanical strength is secured.

As another embodiment of the present invention, the transverse ribs may be disposed in an annular shape around an axial center.

According to the present embodiment, a contact area with the resin is increased and a pull-out load is increased.

As another embodiment of the present invention, the transverse ribs may have a triangular section.

According to the present embodiment, it is possible to secure the flow of resin and prevent the pull-out load from being decreased.

As another embodiment of the present invention, a surface having a radius of curvature of 0.5 mm to 2 mm may be formed in an inner corner portion of the recessed portion.

According to the present embodiment, it becomes easy for carbon fibers to flow into the inner corner portion of the recessed portion, and the accumulation density of the carbon fibers becomes uniform.

As another embodiment of the present invention, a sectional angle of an opening edge portion of the recessed portion may be a right angle or an obtuse angle.

According to the present embodiment, the carbon fibers are continuously accumulated without being broken, and a molded product having no variation in strength is obtained.

As another embodiment of the present invention, a lower end portion of the retainer main body may have a truncated cone shape.

According to the present embodiment, the contact area is increased, the rotational torque is increased, and a press-fitting work becomes easy when the retainer is press-fitted into a press-fit hole.

As another embodiment of the present invention, a washer may be integrally molded with an upper end portion of the retainer main body.

According to the present embodiment, the number of components and the number of assembly steps are reduced, and thus there is an effect of improving productivity.

BRIEF DESCRIPTION OF DRAWINGS

FIG. 27 is a chart illustrating results of a measurement test for a pull-out load of Comparative Examples 1 and 2 and Examples 1 to 4.

FIG. 28 is a chart illustrating results of a measurement test for idling torque of Comparative Examples 1 and 2 and Examples 1 to 4.

DESCRIPTION OF EMBODIMENTS

Embodiments of the retainer according to the present invention will be described with reference to accompanying drawings of FIGS. 1 to 26.

The retainer according to a first embodiment is a nut. As illustrated in FIGS. 1 to 7, the nut includes a nut main body 10 formed with a female thread 11, and a washer 20 integrally molded with an upper end surface of the nut main body 10.

Figure 5:
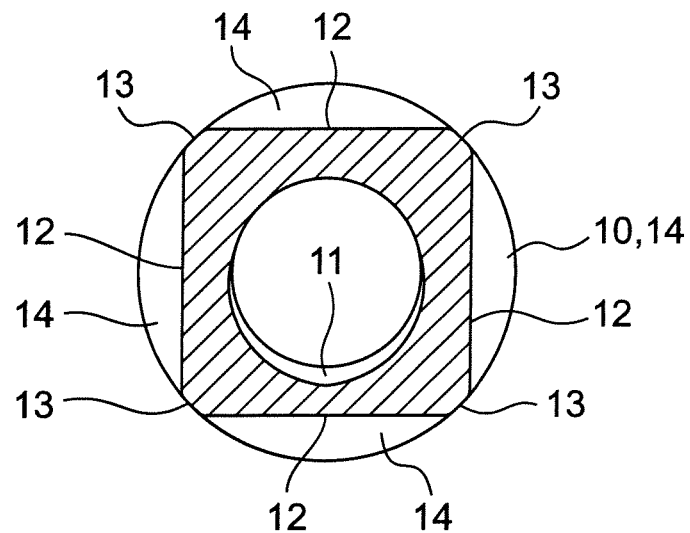
FIG. 5 is a sectional view taken along line V-V of the nut illustrated in FIG. 3.

As illustrated in FIGS. 1 to 4, in the nut main body 10, four recessed portions 12 are provided along an outer circumferential surface at equal angles around an axial center of the female thread 11 to form longitudinal ribs 13. Thus, the nut main body 10 has a substantially square section as illustrated in FIG. 5. The number of recessed portions 12 is not limited to four, and the nut main body 10 may have a substantially triangular section by forming three recessed portions 12 in the nut main body 10. Further, the nut main body 10 may have a polygonal section by forming five or more recessed portions 12 in the nut main body 10.

In the nut main body 10, a plurality of the recessed portions 12 are formed on the outer circumferential surface in upper and lower two stages along the axial center to form a transverse rib 14. The transverse rib 14 is formed in an annular shape around the axial center. The longitudinal ribs 13 and the transverse rib 14 are connected to intersect each other and thus form a frame structure. In particular, the recessed portions 12 provided in the upper stage are shifted from the recessed portions 12 provided in the lower stage by 45 degrees. Thus, the longitudinal ribs 13 in the upper stage and the longitudinal ribs 13 in the lower stage are not disposed on the same straight line, and are disposed in a so-called zigzag shape. As a result, the structural strength of the transverse rib is increased, and there is an advantage that the pull-out strength is improved.

In the present embodiment, the case in which the recessed portions 12 are provided in the upper and lower two stages along the axial center has been described, but without being limited thereto, the recessed portions may be provided in upper and lower three or more stages as necessary. Further, the recessed portions 12 and 12 provided in the upper and lower stages may be formed at the same angle so that the longitudinal ribs 13 formed in the upper and lower stages are disposed on the same straight line. The longitudinal ribs 13 formed in the upper and lower stages may be shifted from each other by a random angle as necessary.

Figure 1:
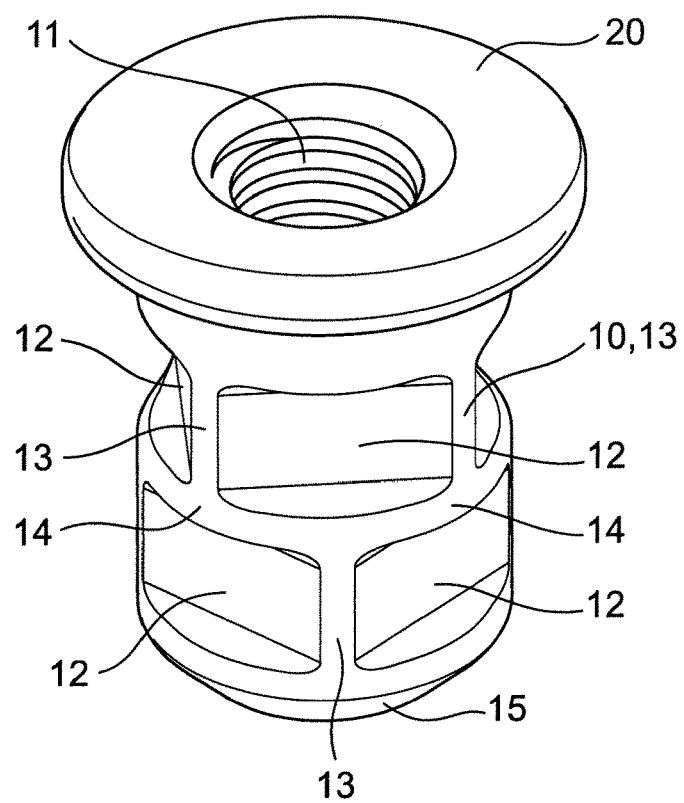
FIG. 1 is a perspective view illustrating a first embodiment of a nut according to the present invention.
Figure 2:
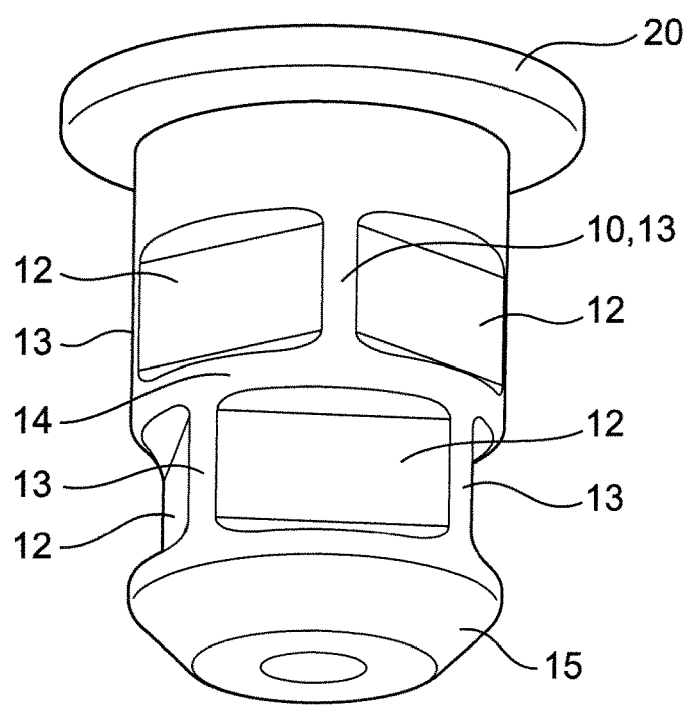
FIG. 2 is a perspective view in which the nut illustrated in FIG. 1 is seen from a different angle.
Figure 3:
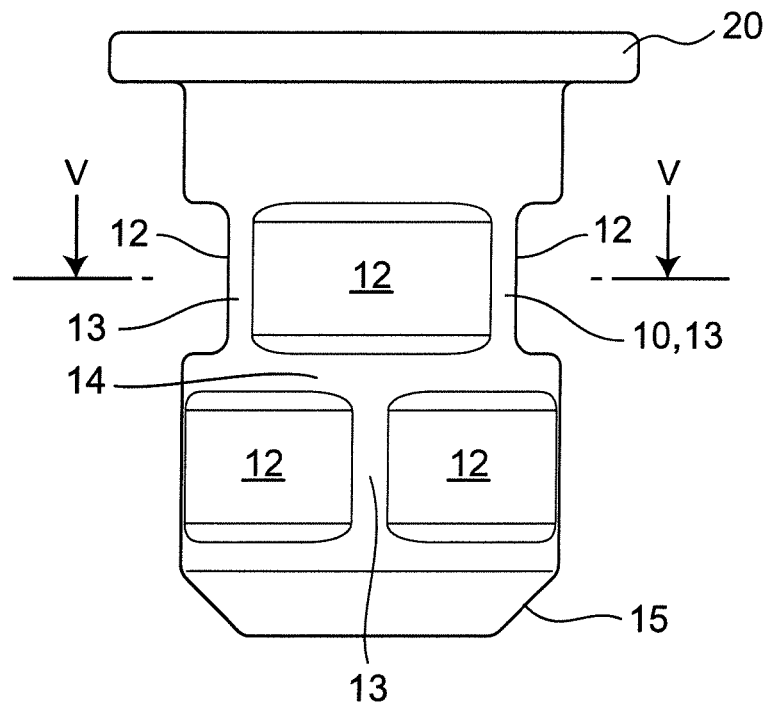
FIG. 3 is a front view of the nut illustrated in FIG. 1.
Figure 4:
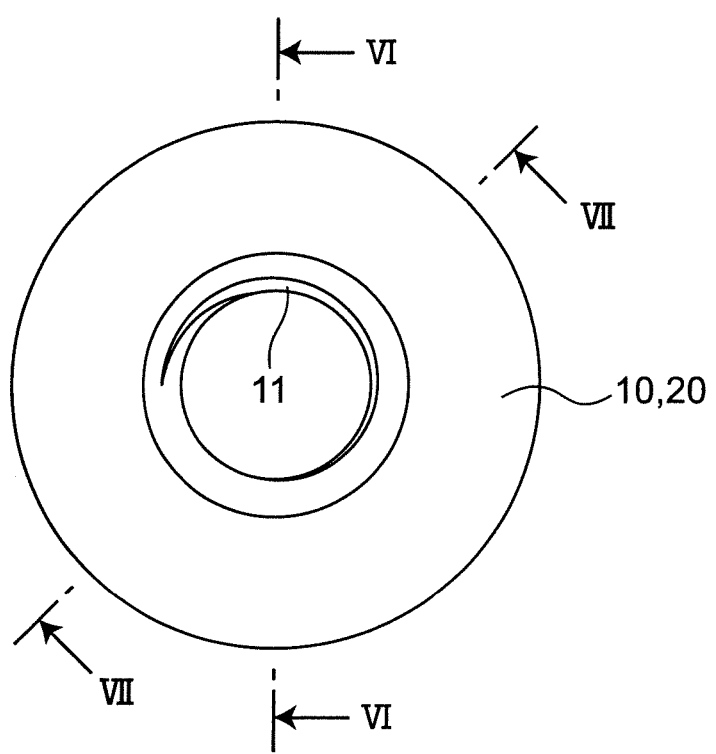
FIG. 4 is a plan view of the nut illustrated in FIG. 1.

As illustrated in FIGS. 2 and 3, the nut main body 10 has a lower end portion 15 which has a truncated cone shape. Accordingly, in a case where the nut of the present embodiment is insert-molded in the base, a contact area with the resin is increased and a resistance force with respect to the rotational torque is increased. Further, there is an advantage that the nut of the present application is easily press-fitted when the nut is press-fitted into a press-fit hole provided in the resin or rubber base, for example.

It is preferable that in a case where the nut is, for example, M6 to M8, the minimum thickness of the nut main body 10 is 0.7 mm to 0.8 mm. This is because that if the minimum thickness is less than 0.7 mm, desired mechanical strength cannot be secured. Further, this is because that if the minimum thickness exceeds 0.8 mm, the recessed portion 12 becomes relatively shallow, and thus desired fastening strength with respect to the base cannot be secured.

Figure 6:
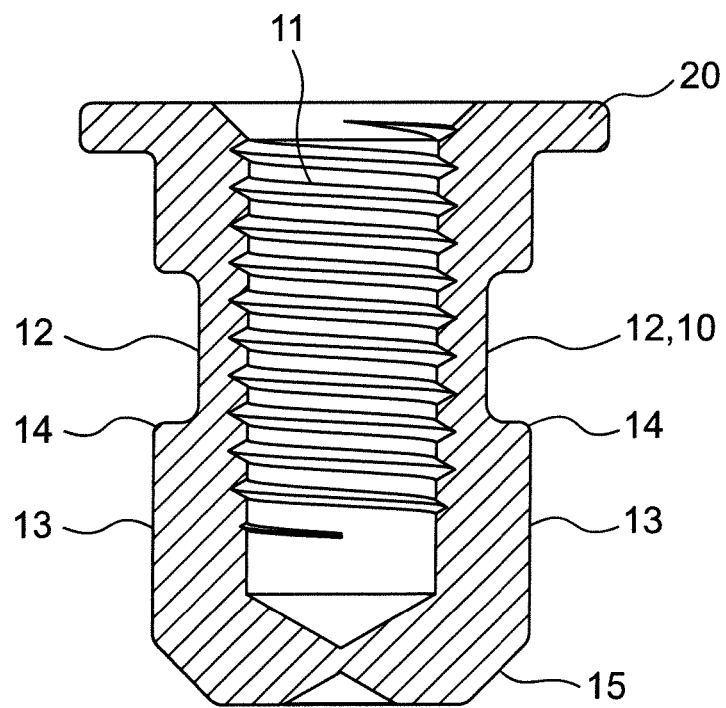
FIG. 6 is a sectional view taken along line VI-VI of the nut illustrated in FIG. 4.
Figure 7:
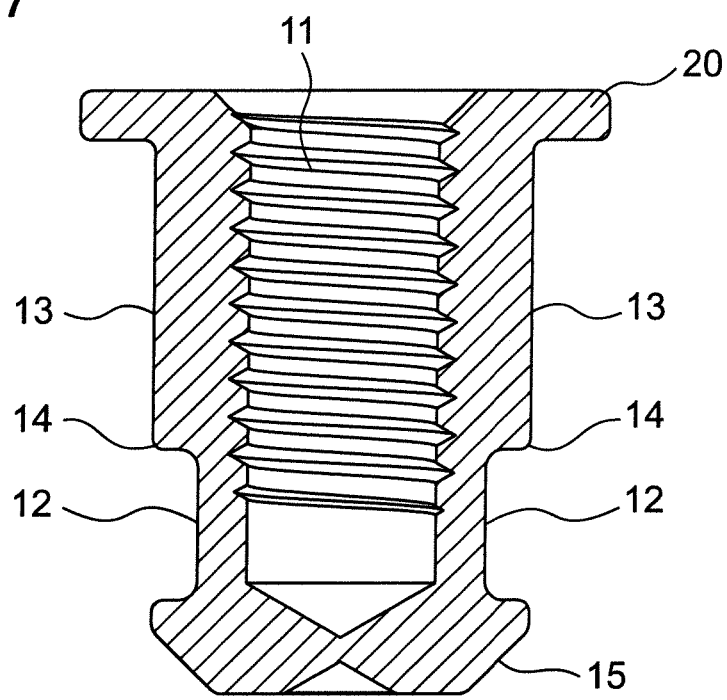
FIG. 7 is a sectional view taken along line VII-VII of the nut illustrated in FIG. 4.

As illustrated in FIGS. 5 to 7, it is preferable that in a case where the nut is, for example, M6 to M8, the radius of curvature of an outer edge portion of the longitudinal ribs 13 and the transverse rib 14 of the nut main body 10 is 0.2 mm to 0.3 mm. This is because that if the radius of curvature is less than 0.2 mm, the tip becomes sharp, a crack or a breakage easily occurs in the resin, and thus the durability is degraded. Further, this is because that if the radius of curvature exceeds 0.3 mm, any interference is reduced, and thus the fastening strength with respect to the base is reduced.

The nut according to the present embodiment can be formed by cutting processing, but cutting processing, heading processing, and rolling processing may be appropriately combined as necessary.

As illustrated in FIGS. 8 to 14, similarly to the first embodiment, the nut of a second embodiment includes the nut main body 10 and the washer 20 integrally molded with the upper end surface of the nut main body 10.

Figure 8:
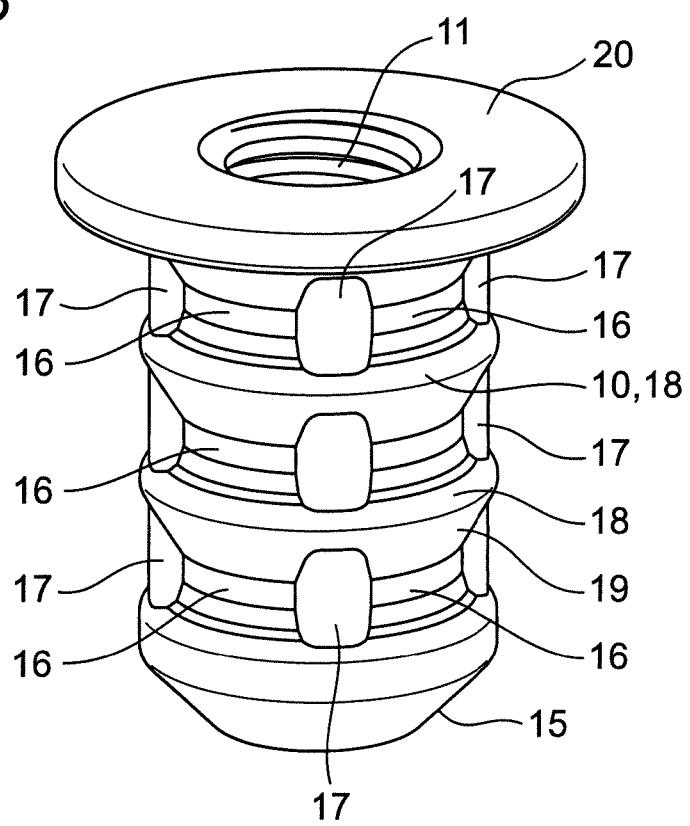
FIG. 8 is a perspective view illustrating a second embodiment of the nut according to the present invention.
Figure 9:
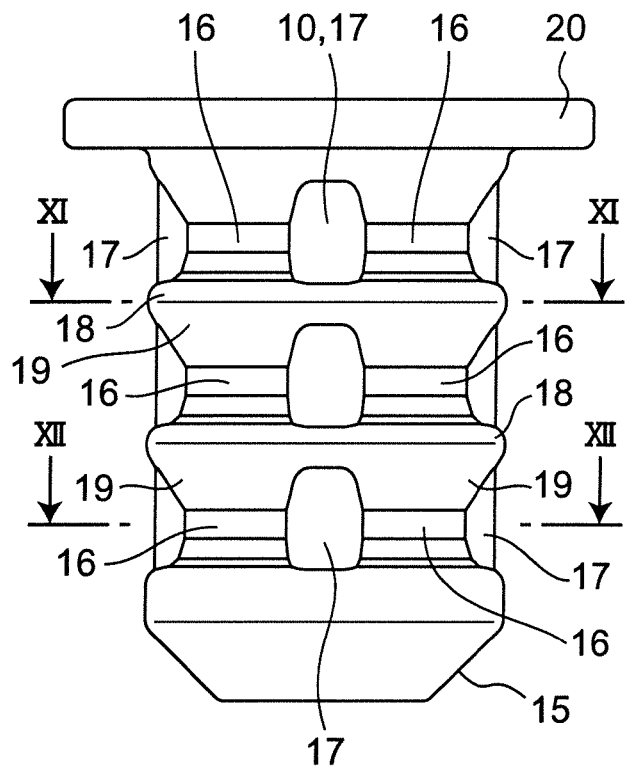
FIG. 9 is a front view of the nut illustrated in FIG. 8.
Figure 10:
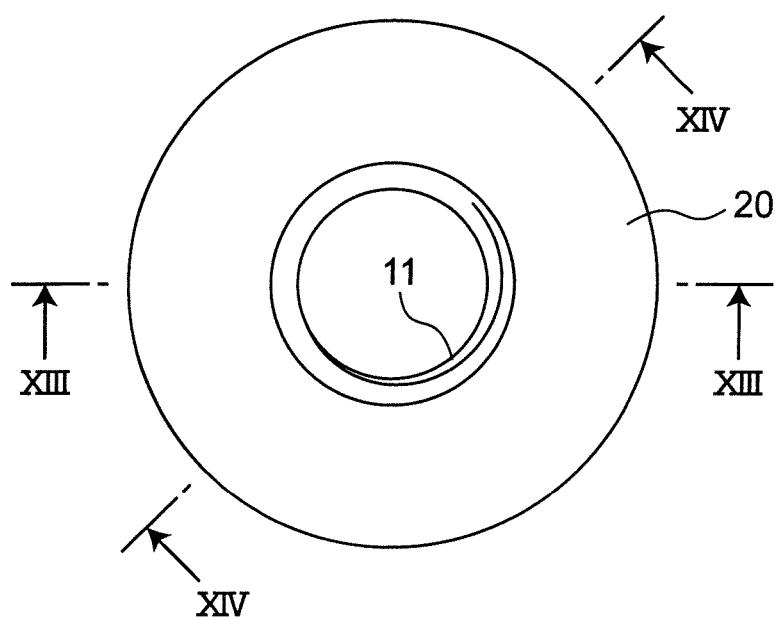
FIG. 10 is a plan view of the nut illustrated in FIG. 8.
Figure 11:
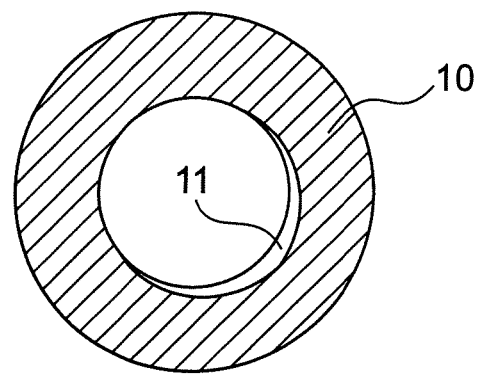
FIG. 11 is a sectional view taken along line XI-XI of the nut illustrated in FIG. 9.
Figure 12:
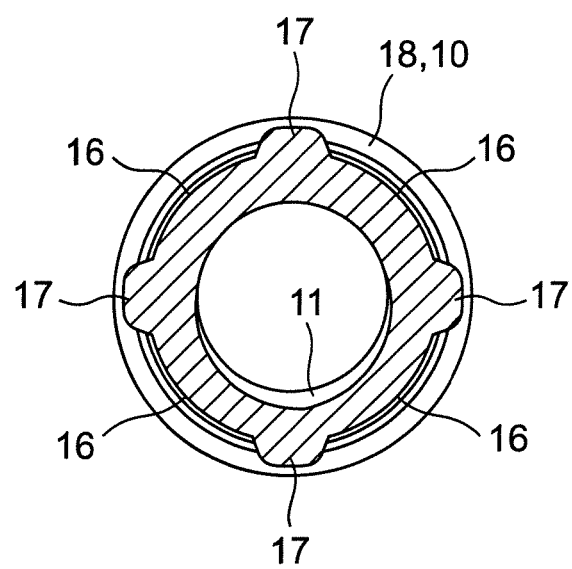
FIG. 12 is a sectional view taken along line XII-XII of the nut illustrated in FIG. 9.
Figure 13:
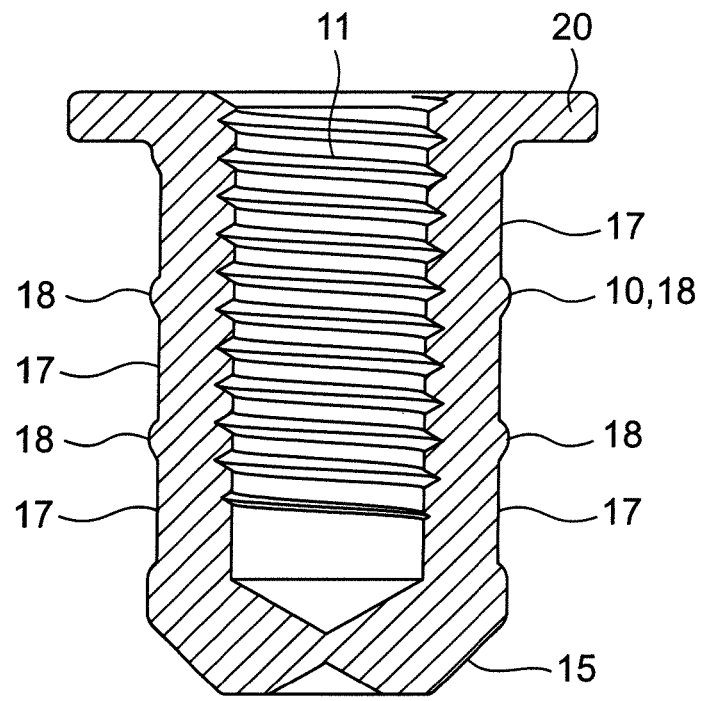
FIG. 13 is a sectional view taken along line XIII-XIII of the nut illustrated in FIG. 10.

As illustrated in FIGS. 8 and 9, in the nut main body 10, four recessed portions 16 are provided on the outer circumferential surface at equal angles around the axial center to form longitudinal ribs 17. The nut main body 10 has a circular section as illustrated in FIG. 11. Further, the longitudinal rib 17 has a substantially trapezoidal section as illustrated in FIG. 12. This is to prevent idling due to large rotational torque while the moldability is secured. The longitudinal rib 17 may have, for example, a substantially triangular section or a substantially semi-circular section depending on the shape of the recessed portion 16. Further, the nut main body 10 is not limited to the case where four recessed portions 16 are provided, and three recessed portions 16 or five or more recessed portions 16 may be provided in the nut main body 10 to form the longitudinal ribs 17.

Figure 14:
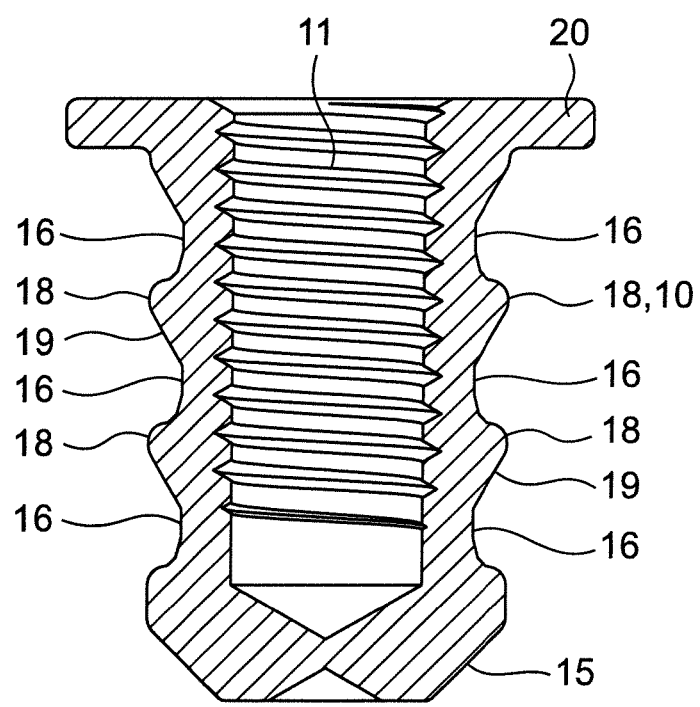
FIG. 14 is a sectional view taken along line XIV-XIV of the nut illustrated in FIG. 10.

In the nut main body 10, a plurality of the recessed portions 16 are formed on the outer circumferential surface in upper and lower three stages along the axial center to form transverse ribs 18. The transverse ribs 18 are disposed in an annular shape around the axial center, and are continuous. As illustrated in FIG. 14, the transverse rib 18 has a cross section of a substantially right-angled triangle provided with an inclined surface 19 on a lower side. Accordingly, the nut main body 10 is shaped to be not only difficult to pull out from the base in an axial center direction but also easily press-fitted.

Further, in the nut main body 10, for example, the recessed portions 16 may be formed in the upper and lower two stages similarly to the first embodiment, and the recessed portions 16 may be formed in upper and lower four stages.

In the nut main body 10, the longitudinal ribs 17 and the transverse ribs 18 intersect each other, are connected to each other, and thus form a frame structure. This is to maintain the rigidity of the nut, and to cause the nut to hardly idle when the rotational torque acts on the nut.

The longitudinal ribs 17 are disposed on the same straight line, but may be disposed in a so-called zigzag shape. The longitudinal rib 17 is formed to have a symmetrical section, but is not necessarily limited thereto. For example, the longitudinal rib 17 may have a cross section of a substantially right-angled triangle similarly to the transverse ribs 18, to enhance a resistance force with respect to the rotational torque in a specific direction.

According to the present embodiment, the longitudinal ribs 17 and the transverse ribs 18 respectively resist the rotational torque and the tensile force acting on the nut, and prevent idling and falling-off of the nut, and thus a nut having high fastening strength can be provided.

The nut according to the present embodiment can be formed by heading processing, but cutting processing, heading processing, and rolling processing may be appropriately combined as necessary.

Figure 15:
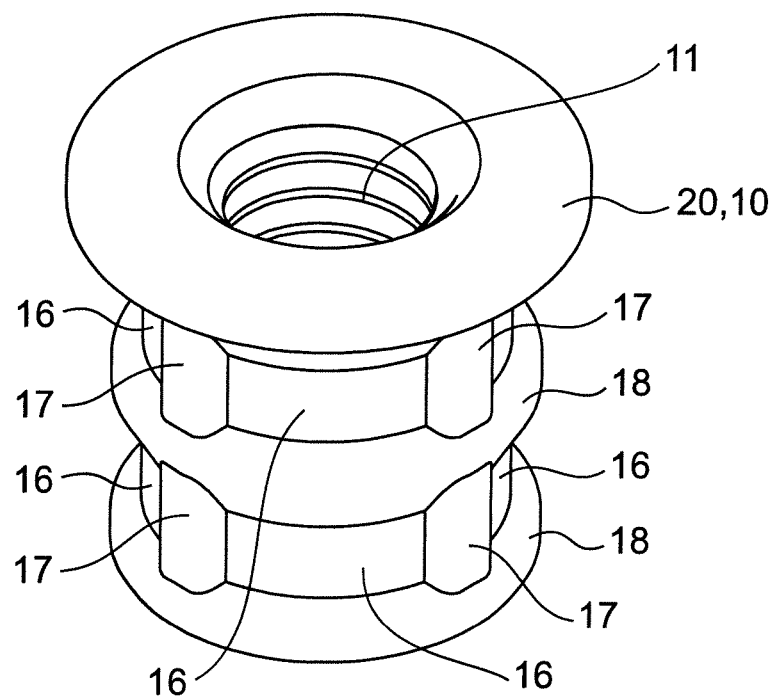
FIG. 15 is a perspective view illustrating a third embodiment of the nut according to the present invention.
Figure 16:
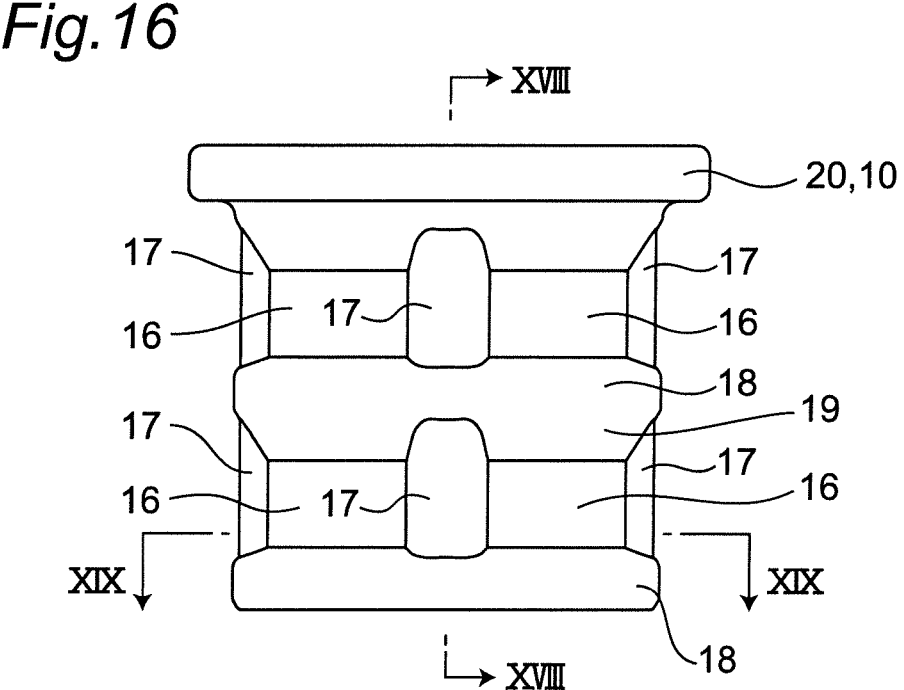
FIG. 16 is a front view of the nut illustrated in FIG. 15.
Figure 17:
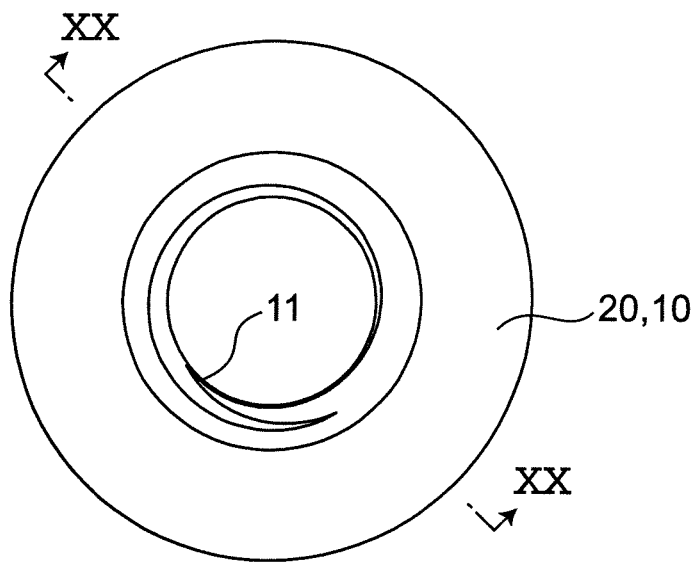
FIG. 17 is a plan view of the nut illustrated in FIG. 15.
Figure 18:
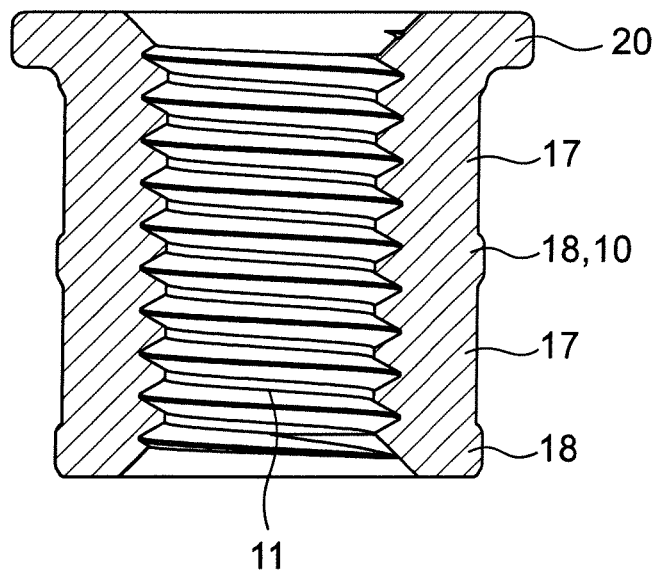
FIG. 18 is a sectional view taken along line XVIII-XVIII of the nut illustrated in FIG. 16.
Figure 19:
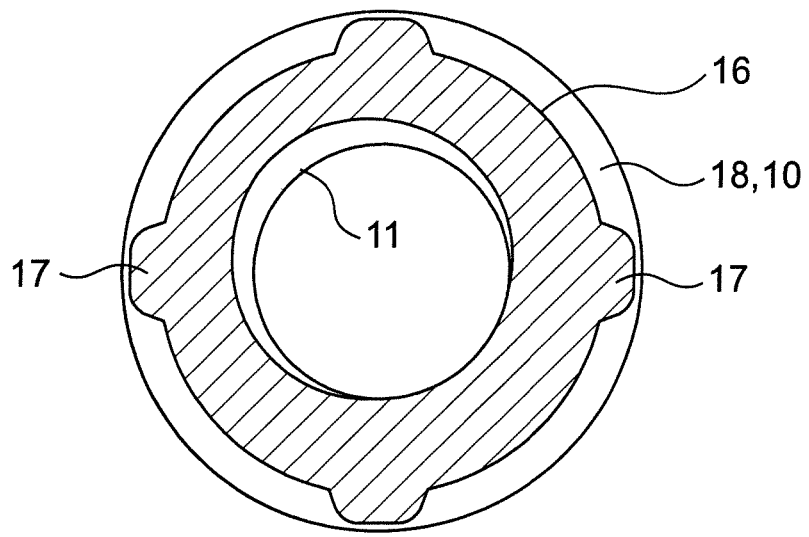
FIG. 19 is a sectional view taken along line XIX-XIX of the nut illustrated in FIG. 16.
Figure 20:
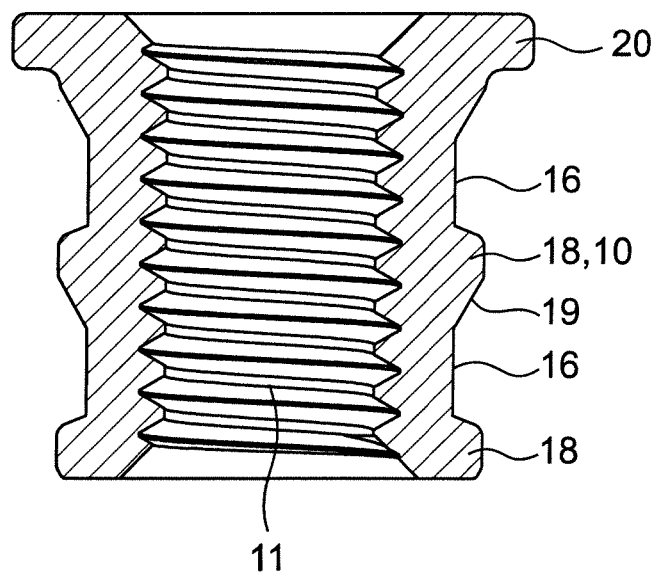
FIG. 20 is a sectional view taken along line XX-XX of the nut illustrated in FIG. 17.

As illustrated in FIGS. 15 and 20, a third embodiment is almost the same as the second embodiment, but is different in that the recessed portions 16 are provided in upper and lower two stages and the lower end portion 15 is not provided. Therefore, the nut according to the third embodiment includes the female thread 11 and a thread hole penetrating therethrough. It is obvious that, as a modification example of the third embodiment, the recessed portions 16 may be provided, for example, in upper and lower three stages or upper and lower four stages.

Since the third embodiment is almost the same as the above-described embodiments, same reference numerals are given to the same portions and the description thereof will not be provided.

The retainer according to a fourth embodiment is a collar. As illustrated in FIGS. 21 to 26, the collar has a vertically symmetrical shape, and is formed of a collar main body 21 having a through-hole 22. According to the present embodiment, since the collar has a vertically symmetrical shape, there is no directionality, and thus there is an advantage that the efficiency of working is high.

Figure 21:
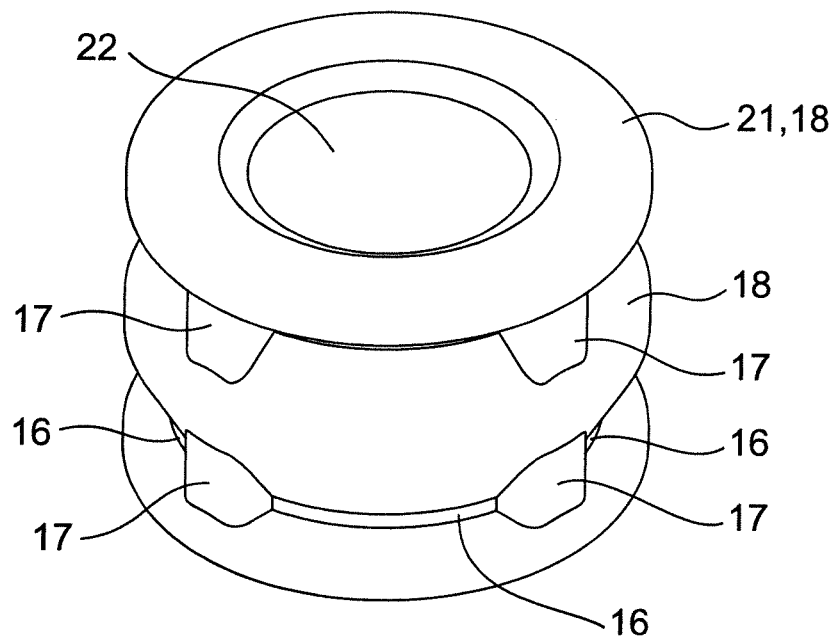
FIG. 21 is a perspective view illustrating a fourth embodiment of the nut according to the present invention.
Figure 22:
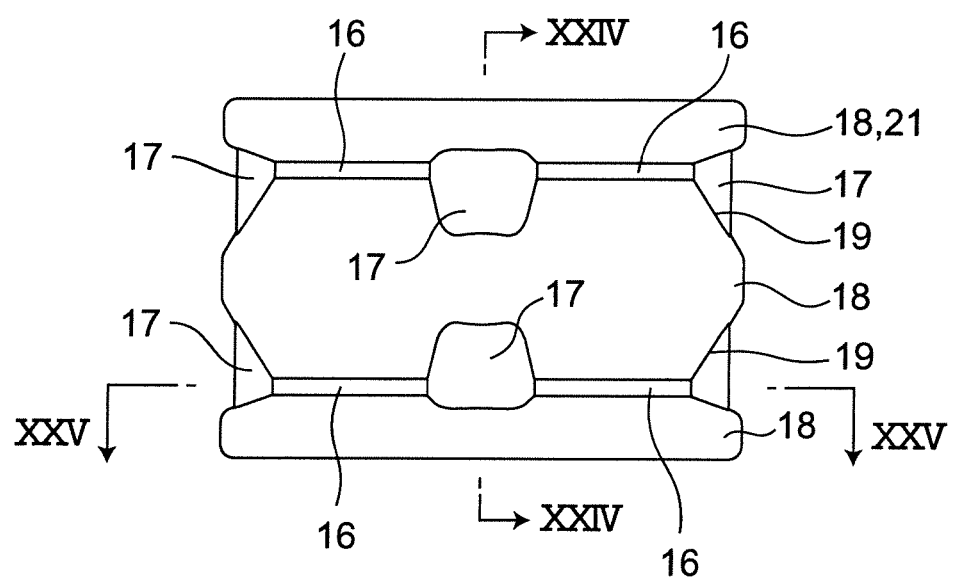
FIG. 22 is a front view of the nut illustrated in FIG. 21.
Figure 23:
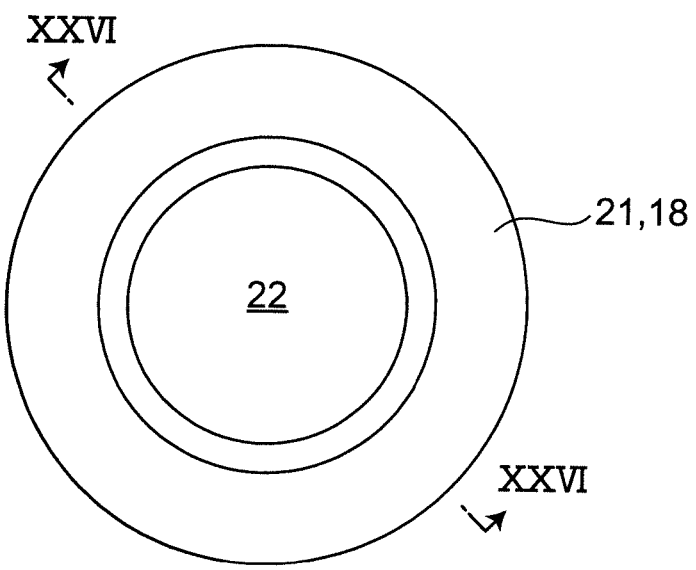
FIG. 23 is a plan view of the nut illustrated in FIG. 21.
Figure 24:
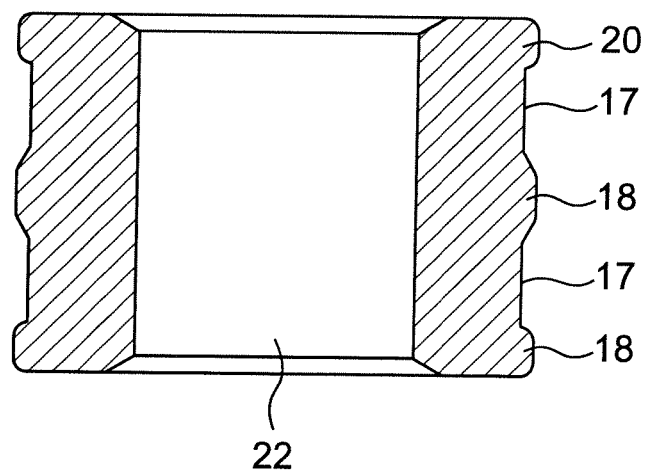
FIG. 24 is a sectional view taken along line XXIV-XXIV of the nut illustrated in FIG. 22.
Figure 25:
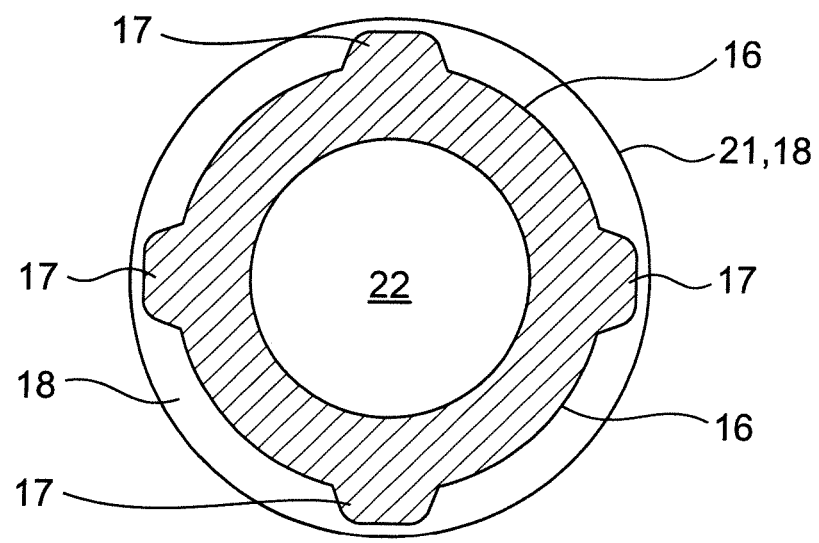
FIG. 25 is a sectional view taken along line XXV-XXV of the nut illustrated in FIG. 22.

More specifically, as illustrated in FIG. 21, in the collar main body 21, four recessed portions 16 are provided on the outer circumferential surface at equal angles around the axial center to form the longitudinal ribs 17. The longitudinal rib 17 has a substantially trapezoidal section as illustrated in FIG. 25. This is to prevent idling due to large rotational torque while the moldability is secured. The longitudinal rib 17 may have, for example, a substantially triangular section or a substantially semi-circular section depending on the shape of the recessed portion 16. Further, the collar main body 21 is not limited to the case where four recessed portions 16 are provided, and three recessed portions 16 or five or more recessed portions 16 may be provided in the collar main body 21 to form the longitudinal ribs 17.

Figure 26:
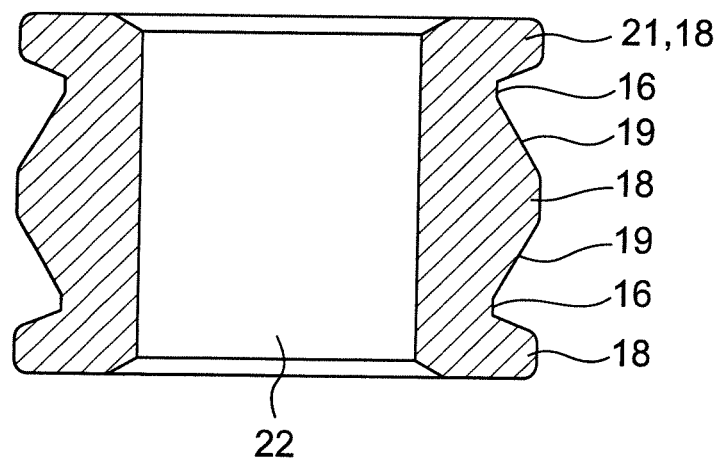
FIG. 26 is a sectional view taken along line XXVI-XXVI of the nut illustrated in FIG. 23.

In the collar main body 21, a plurality of the recessed portions 16 are formed on the outer circumferential surface in upper and lower two stages along the axial center to form transverse ribs 18. The transverse ribs 18 are disposed in an annular shape around the axial center, and are continuous. As illustrated in FIG. 26, the transverse rib 18 has a cross section of a substantially trapezoid provided with inclined surfaces 19 on upper and lower sides. Accordingly, the collar main body 21 is shaped to be difficult to pull out from the base in either the upward or downward direction along the axial center direction.

In the present embodiment, the case in which the recessed portions 16 are provided in the upper and lower two stages along the axial center has been described, but without being limited thereto, the recessed portions may be provided in upper and lower three or more stages as necessary. Further, the recessed portions 16 and 16 provided in the upper and lower stages may be disposed at different angles so that the longitudinal ribs 17 formed in the upper and lower stages are disposed in a zigzag shape. The longitudinal ribs 17 formed in the upper and lower stages may be shifted from each other by a random angle as necessary.

It is obvious that the collar main body 21 of the fourth embodiment may be used as a nut by forming a female thread on the inner circumferential surface of the through-hole 22.

The nut according to the first embodiment to the fourth embodiment may be insert-molded in the resin or rubber base, and may be press-fitted into a lower hole provided in the resin or rubber base.

In the first embodiment to the fourth embodiment, it is preferable that inner corner portions of the recessed portions forming the ribs have a radius of curvature of 0.5 mm to 2 mm in order to improve the flow of a molding resin containing carbon fibers. This is because that if the radius of curvature is less than 0.5 mm, the flow of the carbon fibers becomes worse, and if the radius of curvature exceeds 2 mm, the nut easily falls off from the resin base.

It is obvious that, in the first embodiment to the fourth embodiment, the inner corner portion of the recessed portion is not necessarily rounded, and may be rounded as necessary. In a case where the inner corner portion is not rounded, it is preferable that an opening angle of inner walls of the recessed portion is set to an obtuse angle equal to or greater than 90 degrees in order to improve the flow of the resin.

Further, in the first embodiment to the fourth embodiment, it is preferable that a sectional angle of an opening edge portion of the recessed portion is an obtuse angle equal to or greater than 90 degrees. This is because that if the sectional angle is an acute angle less than 90 degrees, the carbon fibers cannot be uniformly accumulated.

As a molding method, in addition to the insert-molding, resin transfer molding (RTM), sheet molding compound (SMC) molding, and the like are exemplified.

Examples of molding materials include normal molding resins, for example, polypropylene (PP) resins, polyamide (PA) resins, acrylonitrile styrene (AS) resins, acrylonitrile butadiene styrene (ABS) resins, polyether ether ketone (PEEK) resins, polyphenylene sulfide (PPS) resins, polycarbonate (PC) resins, polyacetal (POM) resins, polyamide imide (PAI) resins, epoxy (EP) resins, and polyester (PE) resins. Further, examples of polyester (PE) resins include vinyl ester (VE) resins, polyethylene terephthalate (PET) resins, polybutylene terephthalate (PBT) resins, and polyphenylene oxide (PPO) resins. It is obvious that these molding resins and the above-described molding methods can be appropriately used in combination.

In addition, carbon fiber reinforced resin (carbon fiber reinforced plastic (CFRP)), carbon fiber reinforced thermoplastic resin (carbon fiber reinforced thermoplastic (CFRTP)), and carbon fiber reinforced thermosetting resin (CFRTS) which are obtained by adding carbon fibers to the above-described molding resins may be used. Examples of carbon fibers to be added include PAN-based carbon fibers, isotropic pitch-based carbon fibers, and anisotropic pitch-based carbon fibers, but the manufacturing method thereof is not particularly limited.

The carbon fibers to be added to the carbon fiber reinforced resin (CFRP) can be cut depending on the application to be used by adjusting the length thereof.

It is preferable that the diameter of a single fiber constituting the carbon fibers to be added to the resin is 0.005 mm to 0.02 mm. This is because that if the diameter is less than 0.005 mm, desired strength cannot be secured. Further, this is because that if the diameter exceeds 0.02 mm, it is difficult for the carbon fibers to be uniformly accumulated along the outer circumferential surface of a molded product, and desired moldability cannot be secured.

It is preferable that an addition amount of the carbon fibers to the resin is 20% by weight to 80% by weight. This is because that if the addition amount is less than 20% by weight, the carbon fibers are too small and thus desired strength cannot be obtained. Further, this is because that if the addition amount exceeds 80% by weight, the resultant becomes weak as a molded product and as a result, desired toughness cannot be obtained.

Meanwhile, it is preferable that the carbon fibers to be added to the carbon fiber reinforced thermoplastic resin (CFRTP) has a length of 1 mm to 20 mm. This is because that if the length is less than 1 mm, the bonding of carbon fibers is weak, and thus desired structural strength is hardly obtained, and if the length exceeds 20 mm, the flow of resin during the molding becomes worse.

It is preferable that the diameter of a single fiber constituting the carbon fibers to be added to the thermoplastic resin is 0.005 mm to 0.02 mm. This is because that if the diameter is less than 0.005 mm, desired strength cannot be secured. Further, this is because that if the diameter exceeds 0.02 mm, it is difficult for the carbon fibers to be uniformly accumulated along the outer circumferential surface of a molded product, and desired moldability cannot be secured.

It is preferable that an addition amount of the carbon fibers to the thermoplastic resin is 20% by weight to 50% by weight. This is because that if the addition amount is less than 20% by weight, the carbon fibers are too small and thus desired strength cannot be obtained. Further, this is because that if the addition amount exceeds 50% by weight, the resultant becomes weak as a molded product and as a result, desired toughness cannot be obtained.

EXAMPLES

A pull-out load measurement test and an idling torque measurement test were performed for Examples 1 to 4 and Comparative Examples 1 and 2 to be described below.

Example 1

A sample which was obtained by insert-molding the nut according to the first embodiment using carbon fiber reinforced thermoplastic resin (CFRTP), had a substantially square flange portion at an end of a shaft portion, and had a substantially T-shape in front view was used as Example 1. In the sample of Example 1, the total length was 14 mm, the maximum outer diameter of the shaft portion was 16 mm, one side of the flange portion was 40 mm, and the thickness of the flange portion was 5.0 mm. Further, the thickness of a resin portion was 3.0 mm to 3.5 mm, and the surface of the flange portion was flush with the surface of the washer.

In the nut according to the first embodiment, the total length was 14 mm, the maximum outer diameter of the shaft portion was 10.0 mm, the minimum outer diameter was 7.6 mm, and the female thread of standard M6 was provided. Further, the dimension of the recessed portion provided in the shaft portion in an axial center direction was 3.5 mm, and the radius of curvature of the inner corner portion of the recessed portion was 0.5 mm. This is to cause the carbon fiber reinforced thermoplastic resin to easily flow into the recessed portion. The integrally molded washer had a diameter of 14 mm and a thickness of 1.3 mm.

As the carbon fiber reinforced thermoplastic resin, resin obtained by adding 40% by weight of PAN-based carbon fibers in which a single fiber had a diameter of 0.007 mm to 0.01 mm and a length of 8 mm to 10 mm, to polypropylene resin (PLASTRON (registered trademark) PP-CF40-11(L8) FOOS manufactured by Daicel Corporation) was used.

Example 2

A sample obtained by insert-molding the nut according to the first embodiment in the same manner as in Example 1 described above except that polyamide resin (PLASTRON (registered trademark) PA66-CF40-20(L9)F00L manufactured by Daicel Corporation) was used as the carbon fiber reinforced thermoplastic resin was used as Example 2.

Example 3

A sample which was obtained by insert-molding the nut according to the second embodiment using carbon fiber reinforced thermoplastic resin (CFRTP) (PLASTRON (registered trademark) PP-CF40-11(L8)FOOS manufactured by Daicel Corporation) obtained by adding carbon fibers to the polypropylene resin in the same manner as in Example 1, and had a substantially T-shape in front view was used as Example 3. The outer dimension of Example 3 was the same as that of Example 1.

In the nut according to the second embodiment, the total length was 14 mm, the maximum outer diameter of the shaft portion was 9.5 mm, the minimum outer diameter was 7.8 mm, and the female thread of standard M6 was provided. Further, the width dimension of the recessed portion in the up and down direction was set to 3.2 mm and the opening angle of the inner wall of the recessed portion was set to 120 degrees in order to cause carbon fibers to easily flow into the inner corner portion of the recessed portion and cause carbon fibers to be continuous at the opening edge portion of the recessed portion. Further, the opening edge portion of the transverse rib was set to have a radius of curvature of 0.3 mm. Further, the integrally molded washer had a diameter of 14 mm and a thickness of 1.3 mm.

Example 4

A sample obtained by insert-molding the nut according to the second embodiment in the same manner as in Example 3 described above except that carbon fiber reinforced thermoplastic resin (PLASTRON (registered trademark) PA66-CF40-20(L9)F00L manufactured by Daicel Corporation) obtained by adding carbon fibers to polyamide resin was used was used as Example 4.

Comparative Example 1

A sample which was obtained by insert-molding an insert nut as a commercial product using carbon fiber reinforced thermoplastic resin (CFRTP) obtained by adding carbon fibers to the polypropylene (PP) resin in the same manner as in Example 1, and had the same outer dimension as Example 1 was used as Comparative Example 1.

In the insert nut according to Comparative Example 1, the total length was 14.1 mm, the maximum outer diameter of the shaft portion was 8.7 mm, the minimum outer diameter was 7.4 mm, and the female thread of standard M6 was provided. The washer integrally molded with the insert nut had a diameter of 12 mm and a thickness of 1.3 mm. Two-stage band portions were independently formed in an annular shape on the outer circumferential surface of the shaft portion. Further, multiple spiral grooves were formed on the outer circumferential surface of the two-stage band portions. The spiral grooves respectively formed on the two-stage band portions were provided to have an opposite direction.

Comparative Example 2

A sample obtained by insert-molding the same insert nut as in Comparative Example 1, in the same manner as in Comparative Example 1 described above except that the polyamide resin was used as the carbon fiber reinforced thermoplastic resin was used as Comparative Example 2.

(Pull-Out Load Measurement Test)

M6 bolts having a strength grade of 10.9 and a total length of 40 mm were respectively screwed into the fixed samples of Examples 1 to 4 and Comparative Examples 1 and 2. Measurement was carried out by applying a tensile load to the bolt with a tensile load of 50 kN at a tensile rate of mm/minute using AG-XPlus manufactured by SHIMADZU CORPORATION, until the nut was pulled out or the base was broken.

In an initial tension stage, a displacement and a load maintained a proportional relationship, but since the tensile load began to fall sharply when a predetermined load was reached, the load when the tensile load began to fall was set as the pull-out load. Results of the measurement test are listed in FIG. 27. The minimum values are colored with gray as a mark.

As apparent from FIG. 27, it was found that when the polypropylene resin was used as the carbon fiber reinforced thermoplastic resin, the pull-out loads of Examples 1 and 3 were greater than that of Comparative Example 1.

Also, it was found that when the polyamide resin was used as the carbon fiber reinforced thermoplastic resin, the pull-out load of Example 4 was greater than that of Comparative Example 2.

Since it was apparent that the pull-out load of Example 2 was greater than that of Comparative Example 2 from the results of the measurement test for Examples 1 and 3, the measurement test for Example 2 was not carried out.

From the above measurement tests, it was found that Examples 1 to 4 were able to withstand a pull-out load greater than that of Comparative Examples 1 and 2.

(Idling Torque Measurement Test)

M6 bolts having a strength grade of 10.9 were respectively screwed into the fixed samples of Examples 1 to 4 and Comparative Examples 1 and 2 via two M6 washers. Rotational torque was applied by rotating the bolt using a torque wrench (T45N) manufactured by TOHNICHI until the base was broken or the bolt was broken. Results of the measurement test are listed in FIG. 28.

As apparent from FIG. 28, it was confirmed that, except for Example 1, Example 3 had idling torque substantially the same as that of Comparative Example 1. Example 1 has numerical values slightly lower than those of Comparative Example 1, but the numerical values are in an allowable range as long as the bolt has an M6 size and the rotational torque is 15.0 N·m or greater, and thus there is no practical problem.

Further, it was confirmed that Examples 2 and 4 had idling torque equal to or greater than that of Comparative Example 2.

From the above measurement tests, it was confirmed that Examples 1 to 4 were able to withstand rotational torque substantially the same as that of Comparative Examples 1 and 2, and there is no practical problem.

From the above results, it was confirmed that Examples 1 to 4 were nuts having a fastening force substantially the same as that of Comparative Examples 1 and 2 since Examples 1 to 4 were able to withstand the pull-out load and the rotational torque substantially the same as those of Comparative Examples 1 and 2.

(Molding Measurement Test)

Samples obtained by cutting Examples 1 and 2 were respectively used as Examples 5 and 6.

Samples obtained by insert-molding an insert nut, which was manufactured by imitating an insert nut as a commercial product, using polypropylene (PP) resins or polyamide (PA) resins and cutting the resultant were used as Comparative Examples 3 and 4.

Cross sections of Examples 5 and 6 and Comparative Examples 3 and 4 were photographed (200 magnifications), and the obtained photographs are shown in FIGS. 29 and 31, and FIGS. 30 and 32.

Figure 29:
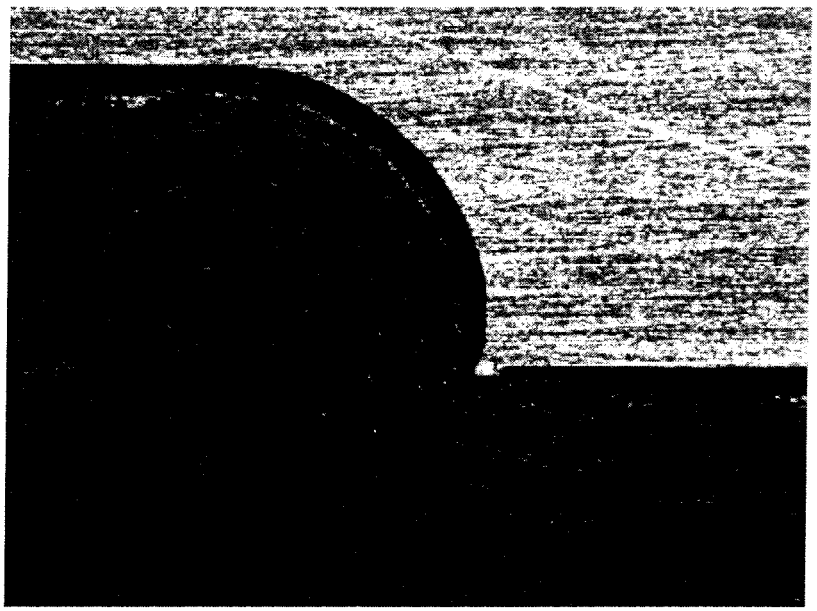
FIG. 29 is a chart illustrating a result of a molding measurement test of Example 5.

As apparent from the photograph shown in FIG. 29, in Example 5 in which the radius of curvature of the inner corner portion was 0.5 mm, it was found that long carbon fibers were uniformly and beautifully accumulated along the corner portion of the recessed portion. In addition, it was found that, even at the opening edge portion of the recessed portion of which the sectional angle was substantially a right angle, carbon fibers were continuously accumulated without being broken.

Figure 30:
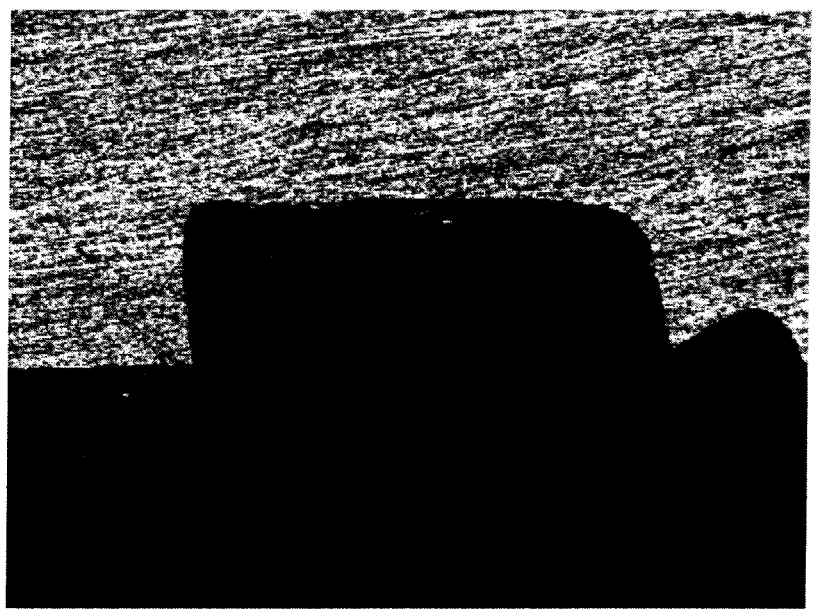
FIG. 30 is a chart illustrating a result of a molding measurement test of Comparative Example 3.

Meanwhile, as shown in FIG. 30, in Comparative Example 3 in which the radius of curvature of the inner corner portion of the recessed portion was 0.1 mm, it was found that carbon fibers did not uniformly enter the corner of the inner corner portion of the recessed portion. Further, it was found that, at the opening edge portion of the recessed portion of which the sectional angle was an acute angle, the accumulation state of carbon was not clear and variation in the accumulation density of carbon fibers was large.

Figure 31:
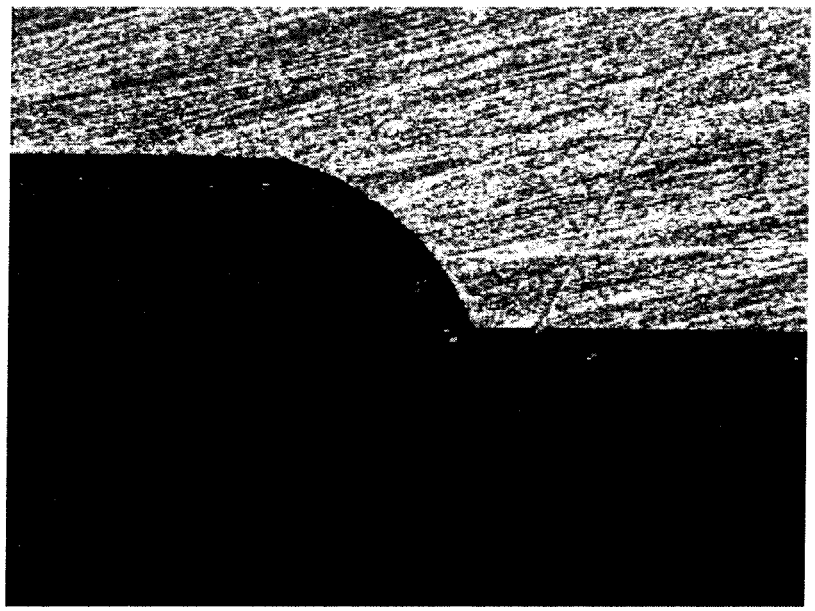
FIG. 31 is a chart illustrating a result of a molding measurement test of Example 6.

As apparent from the photograph shown in FIG. 31, in Example 6 in which the radius of curvature of the inner corner portion of the recessed portion was 0.5 mm, it was found that long carbon fibers were uniformly and beautifully accumulated along the inner corner portion. In addition, it was found that, even at the opening edge portion of the recessed portion of which the sectional angle was an obtuse angle, carbon fibers were accumulated at a uniform accumulation density without being broken from the inner corner portion.

Figure 32:
FIG. 32 is a chart illustrating a result of a molding measurement test of Comparative Example 4.

Meanwhile, as shown in FIG. 32, in Comparative Example 4 in which the radius of curvature of the inner corner portion of the recessed portion was 0.1 mm, it was found that carbon fibers did not uniformly enter the corner of the inner corner portion and were not accumulated at a uniform thickness. Further, it was found that, at the opening edge portion of the recessed portion of which the sectional angle was an acute angle, the accumulation density of carbon fibers was not uniform as in the inner corner portion, and there was variation in the accumulation density of carbon fibers.

From the results of the above molding measurement tests, it was found that when the radius of curvature of the inner corner portion of the recessed portion was 0.5 mm, the accumulation of carbon fibers was uniform and beautiful. In addition, it was found that when the sectional angle of the opening edge portion of the recessed portion was a right angle or an obtuse angle, variation in the accumulation density of carbon fibers was small.

In contrast, it was found that when the radius of curvature of the inner corner portion of the recessed portion was 0.1 mm, carbon fibers hardly entered the corner of the inner corner portion and variation in the accumulation density was large. Further, it was found that when the sectional angle of the opening edge portion of the recessed portion was an acute angle, variation in the accumulation density of carbon fibers was large.

Unlike the related art, Examples 1 to 6 do not have a sharp corner. Therefore, even when minute vibration is applied to the base for a long period of time, crack or breakage hardly occurs and a fastening force is hardly reduced, and thus, a nut having high durability is obtained.

INDUSTRIAL APPLICABILITY

It is obvious that the retainer according to the present embodiment can be applied to a nut having another shape without being limited to the above-described embodiments.

In addition, the retainer according to the present embodiment can be applied to a collar which has a simple through-hole and does not have a female thread.

Further, the fitting hole of the retainer of the present embodiment is not necessarily a through-hole, and may be a bottomed fitting hole.

REFERENCE SIGNS LIST

10 nut main body
11 female thread
12 recessed portion
13 longitudinal rib
14 transverse rib
15 lower end portion
16 recessed portion
17 longitudinal rib
18 transverse rib
19 inclined surface
20 washer
21 collar main body
22 through-hole

The invention claimed is:

1. A retainer comprising:
   a retainer main body having a fitting hole, and pre-embedded in a resin base containing carbon fiber;
   longitudinal ribs formed between a plurality of recessed portions provided along an outer circumferential surface of the retainer main body, and formed parallel along an axial center direction; and
   transverse ribs formed between a plurality of recessed portions provided on the outer circumferential surface of the retainer main body along an axial center direction,
   wherein the longitudinal ribs and the transverse ribs are connected so as to intersect each other, and thus form a frame structure, and
   wherein a surface having a radius of curvature of 0.5 mm to 2 mm is formed in an inner corner portion of the recessed portions.

2. The retainer according to claim 1, wherein the fitting hole has a bottom surface.

3. The retainer according to claim 1, wherein the fitting hole is a through-hole.

4. The retainer according to claim 1, wherein a female thread is provided on an inner circumferential surface of the fitting hole.

5. The retainer according to claim 1, wherein the longitudinal ribs are disposed in a zigzag shape along an axial center.

6. The retainer according to claim 1, wherein the longitudinal ribs are disposed on the same straight line along an axial center.

7. The retainer according to claim 1, wherein the longitudinal ribs have a trapezoidal section.

8. The retainer according to claim 1, wherein the transverse ribs are disposed in an annular shape around an axial center.

9. The retainer according to claim 1, wherein the transverse ribs have a triangular section.

10. The retainer according to claim 1, wherein a sectional angle of an opening edge portion of the recessed portion is a right angle or an obtuse angle.

11. The retainer according to claim 1, wherein a lower end portion of the retainer main body has a truncated cone shape.

12. The retainer according to claim 1, wherein a washer is integrally molded with an upper end portion of the retainer main body.

* * * * *